United States Patent [19]
McQueen

[11] Patent Number: 6,028,665
[45] Date of Patent: Feb. 22, 2000

[54] SELF-LEVELING LASER PLUMB

[76] Inventor: John McQueen, 2933 Riverside Dr., Sarasota, Fla. 34234

[21] Appl. No.: 09/150,226

[22] Filed: Sep. 9, 1998

[51] Int. Cl.[7] .............................. G01C 9/12; G01C 15/00
[52] U.S. Cl. .............................. 356/250; 33/227; 33/286
[58] Field of Search ..................... 356/147, 149, 356/248, 250, 172, 399; 33/227, 286, DIG. 21, 281, 282, 290, 299, 283, 285, 291, 340, 341, 370, 371, 407, 451, 375, 384, 387, 388

[56] References Cited

U.S. PATENT DOCUMENTS

| | | | |
|---|---|---|---|
| 3,505,739 | 4/1970 | Abrams | 33/189 |
| 3,588,249 | 6/1971 | Studebaker | 356/4 |
| 3,591,926 | 7/1971 | Trice | 33/46 |
| 3,911,588 | 10/1975 | Ohneda | 33/286 |
| 4,448,528 | 5/1984 | McManus | 356/250 |
| 5,012,585 | 5/1991 | DiMaggio | 33/286 |
| 5,481,809 | 1/1996 | Rooney | 33/392 |
| 5,537,205 | 7/1996 | Costa | 356/250 |
| 5,572,797 | 11/1996 | Chase | 33/286 |
| 5,644,850 | 7/1997 | Costales | 33/282 |
| 5,680,208 | 10/1997 | Butler | 356/250 |
| 5,754,287 | 5/1998 | Clarke | 356/250 |

*Primary Examiner*—Frank G. Font
*Assistant Examiner*—Michael Stafira
*Attorney, Agent, or Firm*—Charles J. Prescott

[57] ABSTRACT

A self-leveling laser plumb apparatus comprising an elongated straight tubular housing having an upper end and a pointed lower end thereof and a laser beam module pre-aligned and connected in said upper end in conjunction with confirmed precise alignment of a laser beam emitted from the laser beam module with a longitudinal axis of said housing. The pointed lower end of the housing is also in precise alignment with the longitudinal axis of said housing. A generally elongated C-shaped support includes a lower base supportable in a horizontal surface and an upper housing suspension member which is cooperatively structured with an upper portion of the housing to suspend the housing with the laser beam module in place in free-moving pendulum fashion. With the pointed lower end positioned just above the horizontal surface, a laser beam from said laser beam module strikes an overhead surface directly vertically above a mark on the horizontal surface over which said pointed lower end is aligned.

4 Claims, 4 Drawing Sheets

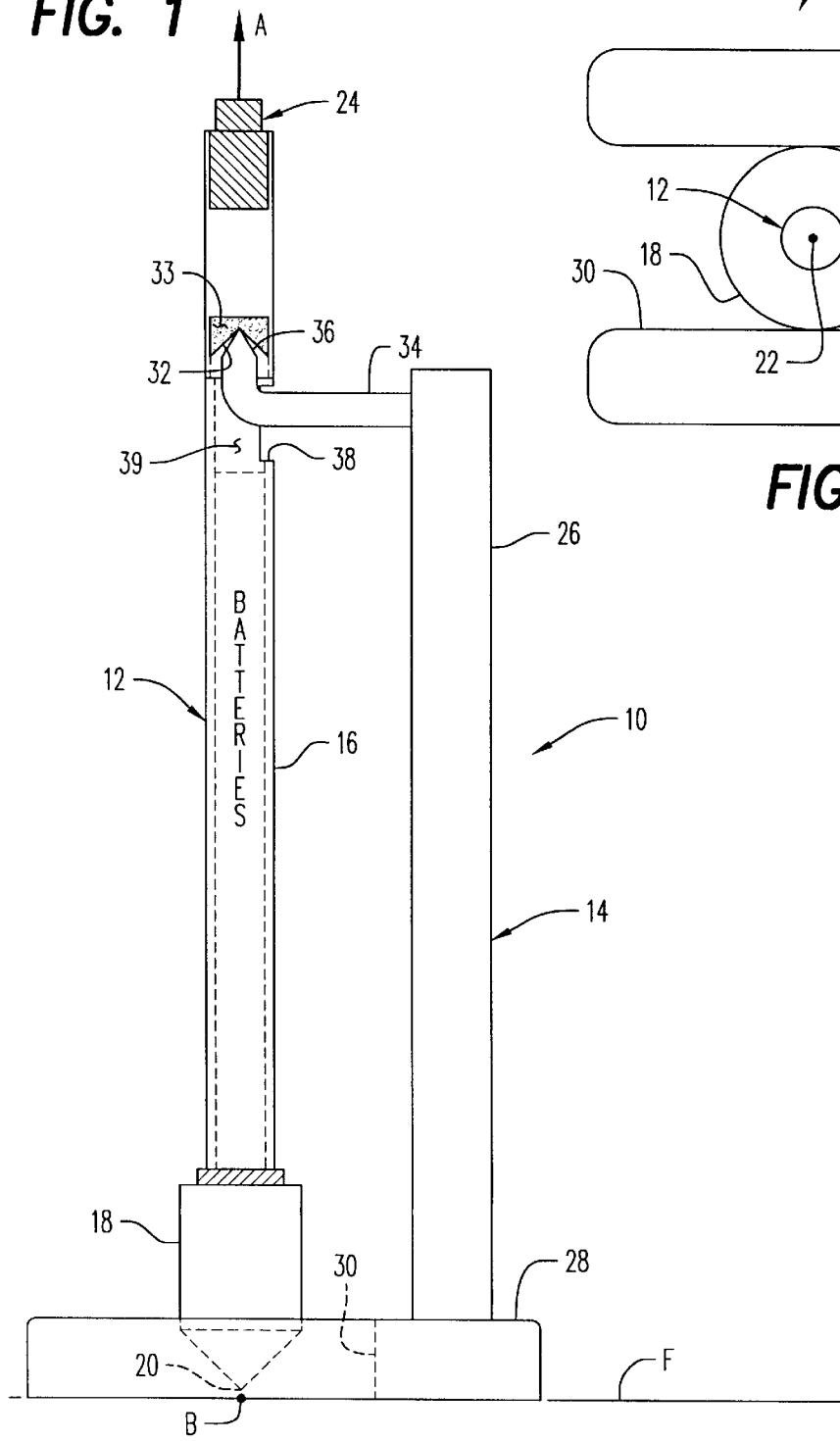
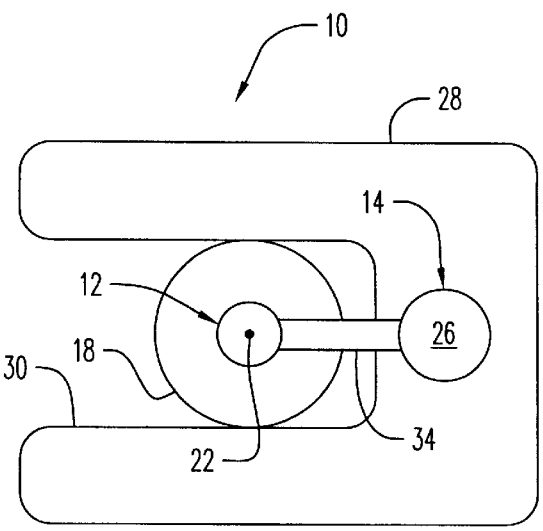
FIG. 1
FIG. 2

ALIGNMENT FIXTURE
FIG. 5
FIG. 6
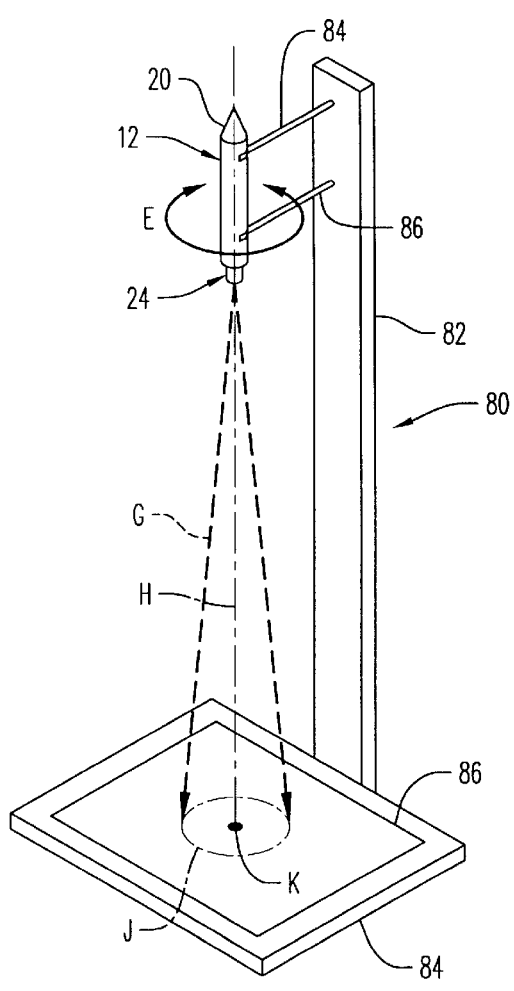
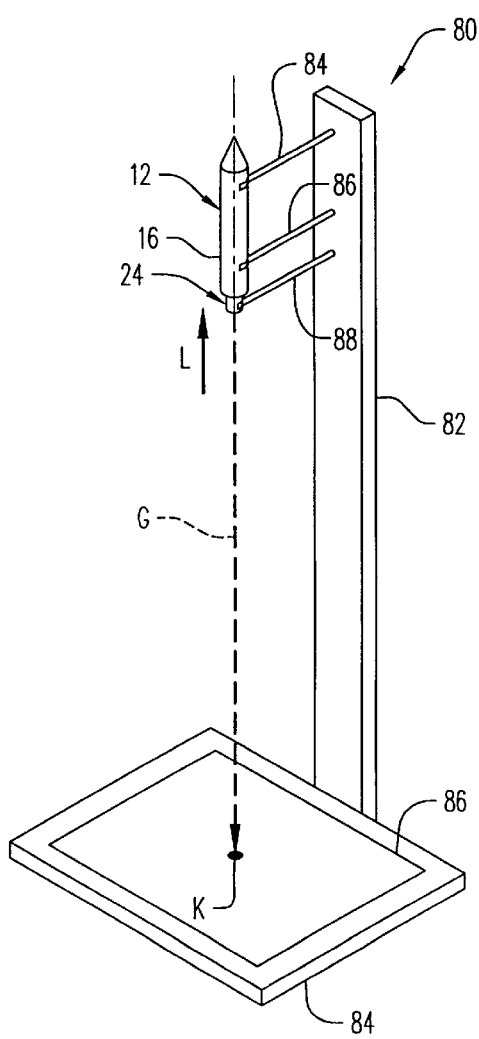

SELF-LEVELING LASER PLUMB

BACKGROUND OF THE INVENTION

1. Scope of Invention

This invention relates generally to plumb bobs, and more particularly to a self-leveling laser beam type plumb apparatus.

2. Prior Art

In building construction and ceiling installation and in other areas within building and homes, many times it becomes necessary to locate a spot or a line, or a series of either, onto an overhead structure or ceiling of the building. To accomplish this, the marks or lines are first typically laid out on the floor or horizontal working surface and then, using a conventional gravity plumb bob, two men are required to effect the transfer, one person holding the upper end of the string of the plumb bob against the overhead surface while the other insures that the lower pointed end of the plumb bob itself is positioned by gravity over the corresponding marks and lines on the floor.

A number of devices have been patented which facilitate this procedure. Abrams, in U.S. Pat. No. 3,505,739 teaches an apparatus for transferring floor to ceiling markings. A gimbal arrangement in conjunction with an incandescent bulb projected "x" directly above the lower pointed end of its plumb bob effects this procedure. However, Abrams projects an ever-increasingly large and obscure "x" as a shadow and also includes more complex gimbal arrangements which may be difficult to maintain in precise working order.

In U.S. Pat. No. 5,537,205, Costa also teaches a self-leveling laser plumb assembly which utilizes a gimbal arrangement for vertically aligning by gravity a housing which holds a laser beam unit mounted axially within the housing. The delicacy of the gimbal arrangement and the accuracy with which the laser unit projects a true axial beam in precision alignment with the longitudinal axis of the plumb bob is questionable.

Another portable laser plumb line indicator is taught by McManus in U.S. Pat. No. 4,448,528. This disclosure teaches a somewhat more complex and expensive apparatus which claims to direct a truly accurate laser beam both downwardly to the mark on the floor and upwardly to the point on the ceiling or overhead structure. This apparatus is quite complex and expensive to manufacture and appears only useful for more sophisticated and complex projects.

Applicant is also aware of the following additional U.S. patents which are somewhat more remotely related to the present invention:

Rooney U.S. Pat. No. 5,481,809
Chase U.S. Pat. No. 5,572,797
Trice U.S. Pat. No. 3,591,926
DiMaggio U.S. Pat. No. 5,012,585
Studebaker U.S. Pat. No. 3,588,249
Ohneda U.S. Pat. No. 3,911,588
Butler U.S. Pat. No. 5,680,208

The present invention provides a very economical to manufacture and easily useable and dismantleable laser plumb bob which, by utilization of the herebelow described laser beam alignment fixture, provides an extremely accurate, yet economical tool for the transfer of floor or work surface mounting markings up to a ceiling or other overhead structure. The laser beam alignment fixture and procedure taught by this application have been shown to be of extreme importance with respect to the ultimate accuracy of the laser beam projections of floor markings due to the fact that a part of the economy of the present invention derives from the utilization of low cost currently manufactured miniature laser beam units which do not project a laser beam therefrom which is in precise axial alignment with the physical longitudinal structure thereof.

BRIEF SUMMARY OF THE INVENTION

This invention is directed to a self-leveling laser plumb apparatus comprising an elongated straight tubular housing having an upper end and a pointed lower end thereof and a laser beam module prealigned and connected in said upper end in conjunction with confirmed precise alignment of a laser beam emitted from the laser beam housing with a longitudinal axis of said housing. The pointed lower end of the housing is also in precise alignment with the longitudinal axis of said housing. A generally elongated C-shaped support includes a lower base supportable in a horizontal surface and an upper housing suspension member which is cooperatively structured with an upper portion of the housing to suspend the housing with the laser beam module in place in free-moving pendulum fashion. With the pointed lower end positioned just above the horizontal surface, a laser beam from said laser beam module strikes an overhead surface directly vertically above a mark on the horizontal surface over which said pointed lower end is aligned.

It is therefore an object of this invention to provide a laser beam plumb bob apparatus for accurately projecting floor and working surface markings precisely vertically up to an overhead beam, roof or ceiling structure.

It is another object of this invention to provide an economically manufactured and easily disassemblable laser plumb bob for effecting vertical projections of floor markings to overhead structures.

It is yet another object of this invention to provide a laser plumb bob apparatus which incorporates very inexpensive commercially available laser beam units which, when carefully aligned into the plumb bob housing by the alignment procedures herebelow taught, provides an extremely accurate apparatus for projecting floor or working surface markings upwardly to an overhead structure.

In accordance with these and other objects which will become apparent hereinater, the instant invention will now be described with reference to the accompanying drawings.

BRIEF DESCRIPTION OF THE DRAWINGS

FIG. 1 is a side elevation simplified view of the preferred embodiment of the invention.

FIG. 2 is a top plan view of FIG. 1.

FIG. 5 is a perspective view of an alignment fixture showing the first step in establishing the accurate laser module orientation of the device shown in FIG. 1.

FIG. 6 is a perspective view similar to FIG. 5 showing the second step in the laser beam alignment procedure.

DETAILED DESCRIPTION OF THE INVENTION

Figure 3:
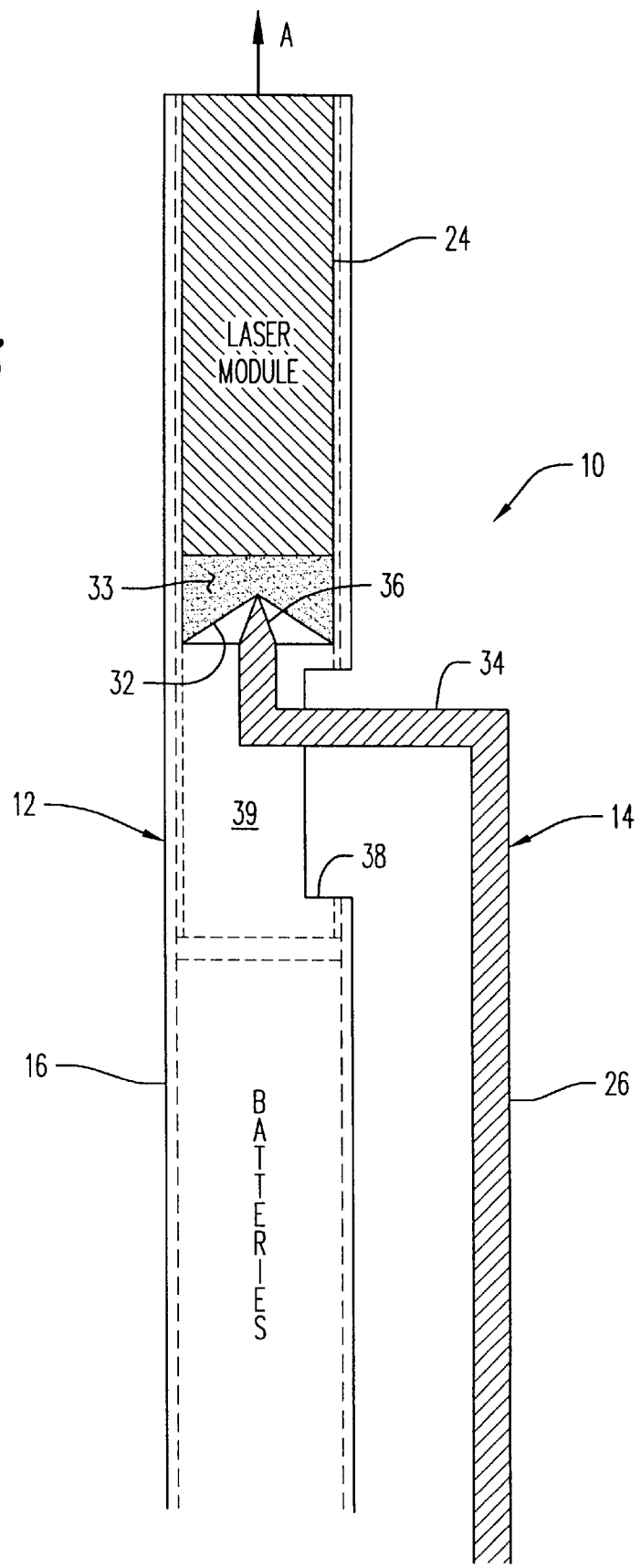
FIG. 3 is an enlarged schematic view of the upper portion of the invention shown in FIG. 1.

Referring now to the drawings and particularly to FIGS. 1 to 3, the preferred embodiment of the invention is there shown at numeral 10. This apparatus 10 includes a laser housing assembly 12, a generally C-shaped support 14 and a laser module 24 mounted into the upper end of the housing assembly 12. Such laser modules are available from Lasermate Corp. as part number PLC6601AR.

The assembly 12 includes an elongated cylindrical aluminum or plastic tubular housing 16 having an enlarged and weighted plumb bob 18 attached at a lower end thereof. The plumb bob 18 includes a pointed lower distal end 20 which is in precision alignment with the longitudinal axis of the housing 16. Housing 16 also provides a receptacle for the small dry cell batteries which power the laser module 24 which, when activated, projects a laser beam upwardly in the direction of arrow A.

The support 14 includes a main upright member 26 formed of wood, plastic or other convenient material and a lower base 28 adapted for being supported on a floor F or other essentially horizontal working surface. The lower base 28 includes a central open area 30 which allows the lower pointed end 20 of the plumb bob 18 to swing freely without contacting the lower base 28 when the apparatus 10 is in use.

The assembly 12 is held in upright free pendulum swinging supported fashion by the interengagement of a conically-shaped pointed distal end 36 of an upper housing suspension member 34 connected to and laterally extending from the upper end of the main upright support member 26. This conical pointed surface 36 engages into a downwardly opening conical-shaped pocket 32 of plug 33 which is rigidly connected within housing 16 below the laser module 24. The upper housing suspension member 34 has access into the central portion of the housing 16 and the conical surface 32 by an aperture 38 formed into the side wall of the housing 16 thus providing a central recess for receiving the distal end of the upper housing suspension member 34.

By this arrangement, with the lower portion of the laser housing assembly 12 below the conical distal end 36 and plug 33 being of a substantially greater weight than that of the portion thereabove, the laser housing assembly 12 will freely pivot in pendulum fashion and become vertically aligned by gravity when at rest with the plumb bob downwardly oriented as shown.

With the apparatus 10 placed atop the floor F, it may be laterally or horizontally positioned so that as the laser housing assembly 12 pivots to a standstill with the lower distal tip 20 of plumb bob 18 is positioned directly over a mark B which has been placed on the floor surface. The laser module 24 will then project a laser beam upwardly in the direction of arrow A to strike the desired overhead surface providing an accurate overhead projection of mark B.

Figure 4:
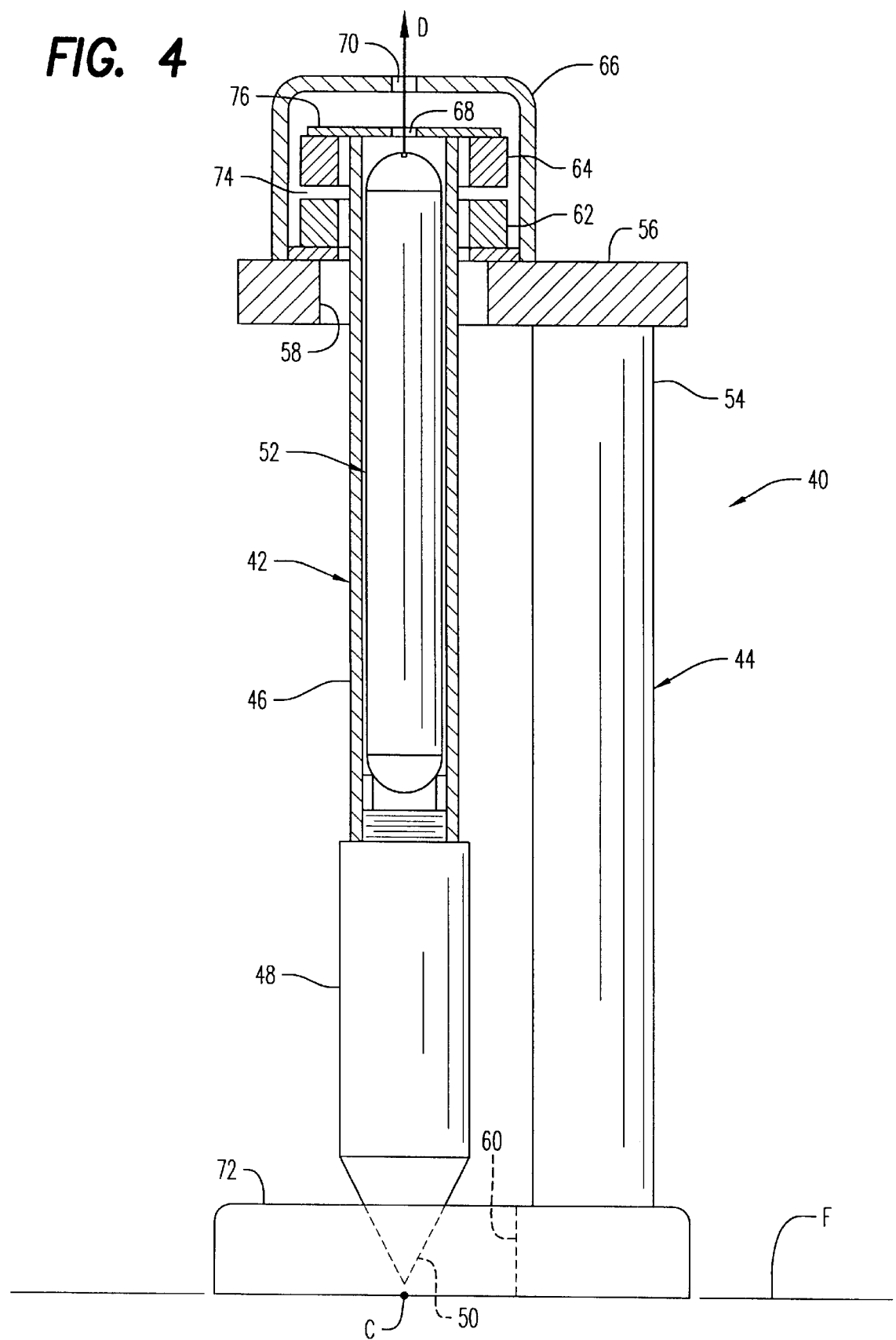
FIG. 4 is a side elevation partial section view of another embodiment of the invention.

Referring now to FIG. 4, another embodiment of the invention is there shown generally at numeral 40. This embodiment generally provides an alternate suspension arrangement for the laser beam housing assembly 42 which takes advantage of the repulsion features of opposingly aligned poles of two ring-shaped spaced apart magnets 62 and 64. This embodiment 40 generally includes a vertically elongated C-shaped support 44 having a lower base 72 adapted for supporting the apparatus 40 atop a horizontal floor surface F. A central clearance slot 60 formed centrally into the lower base 72 again provides ample clearance for the pendulum movement of the plumb bob 48 and its pointed lower conical end 50 connected at the lower end of a tubular elongated cylindrical housing 46. This laser housing assembly 42 includes a self-contained laser beam module 52 having its own internal battery power and is commercially available from CMPExpress.Com, Inc. under item number 045925.

An upper housing suspension member 56 connected and horizontally extending from upright support 54 includes a clearance aperture 58 above which an annular or ring-shaped magnet 62 is connected. Another similarly shaped magnet 64 is connected to the upper end of housing 46. By arranging the magnetic poles of each of these magnets 62 and 64 in opposite directions, a uniform repulsion force is created of sufficient magnitude so as to suspend the laser housing assembly 42 as shown with an air gap or space 74 therebetween. Again, by this arrangement, the laser beam housing assembly 42 is free to pivot in suspended fashion about magnet 62 and 64 so as to establish a true vertical alignment of the longitudinal axis of the laser beam housing 42, which longitudinal axis geometrically passes through the lower pointed distal end 50 of the plumb bob 48.

A cover 66 is provided attached to the upper surface of the upper housing suspension member 56. The cover 66 has an aperture 70 formed centrally therethrough, or alternately a transparent lense placed therein so that the laser beam may fire upwardly in the direction of arrow D passing through aperture 68 of the magnet support plate 76.

Laser Alignment Fixture

To achieve the economy of the present invention while also affording a high degree of accuracy to both the commercial trade and the hobbyist, economical and widely commercially available above-described laser-diode modules are used. The pen or finger-sized laser diode modules of this type are ideally sized and structured for incorporation into the present invention. However, despite the fact that the exterior housing for these commercially available laser diodes are of sufficient uniformity to be precisely aligned in phyical coaxial alignment with the longitudinal axis of the housings 16 and 46, the laser beam emitted from these small laser-diode modules is not coaxial with the longitudinal axis of its own physical body or case. Inaccuracies in alignment between the physical longitudinal axis of the laser module and the laser beam emitted therefrom can range upward to three to four degrees of misalignment or greater. This inaccuracy is unacceptable and would otherwise render the utilization of these economical laser diode modules as unacceptable.

However, applicant has devised a fixture and a procedure for insuring that the laser beam emitted from these laser modules 24 and 52 accurately project a laser beam which is in substantial alignment with the longitudinal axis of the laser beam housing assembly 12 or 42.

Referring now to FIGS. 5 and 6, an alignment fixture 80 is there shown in conjunction with the laser beam housing apparatus 12 which is mounted in an inverted fashion so that the laser beam G is projected downwardly to strike a sheet of paper 16 placed atop a horizontal lower plate 82. An elongated upright member 82 connected at its lower end to horizontal plate 84 includes two spaced support members 84 and 86 which hold the laser housing assembly 12 in a fixed alignment position while allowing it to be simultaneously rotated in the direction of arrow E about the longitudinal axis H of the laser housing assembly 12.

With the laser module 24 temporarily locked into its previously described position, the laser housing assembly 12 is rotated in the direction of arrow B with the laser beam G being activated. Rotational movement in the direction of arrow E is sequential, stopping periodically to mark each point of contact of the laser beam G on the sheet of paper 86. When done throughout he entire 360° rotational arch E, a locus of laser beam impacts J is established in the form of a circle. The physical center of this circle J is located and marked at K. Thereafter, the laser module 24 is removed from the laser beam housing 12.

In FIG. 6, an additional support device 88 is attached to the upright support member 82, which support member 88 will receive and hold the laser module 24 in the desired orientation. The laser module 24 is oriented while generally in its intended position within the laser beam housing 12 as previously described so that the laser beam G strikes the previously established center mark K. A thin piece of soft foam material which has been impregnated with quick set epoxy is wrapped around the body of the laser module 24 which is further slid into the tubular housing 16 into its fully installed position while maintaining the alignment of the laser beam G at center mark K. When this precision alignment is established, the entire arrangement is allowed to set while the epoxy is cured and hardened so as to fix the proper orientation of the laser module 24 within tubular housing 16.

Alternately, the support 88 may be utilized to first accurately position and align the laser module 24 so that emanating laser beam G precisely strikes the center mark K after which the tubular housing 16 and plumb bob 20 of the laser beam housing assembly 12 are slid downwardly over the laser module 24 with the uncured epoxy-impregnated foam material fitting between the laser module 24 and the cylindrical housing 16 for final curing.

This same alignment fixture is used with the embodiment 42 of FIG. 4. After the laser module 52 is properly aligned within the tubular housing 46 as by transversely oriented set screws, spacers or the like, an epoxy-pregnated material is forced between the outer surface of the laser module 52 and the inner surface of the cylindrical housing 46 and allowed to cure to fix the correct and precision alignment of the laser beam to be in precise alignment with the longitudinal axis of the entire laser beam housing assembly 42 and the lower tip 50 of the plumb bob 48.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A self-leveling laser plumb apparatus comprising:
   an elongated tubular housing having an upper end and a pointed lower end thereof;
   a laser beam module connected in said upper end and producing a laser beam emitted from said laser beam module in alignment with a longitudinal axis of said housing, said pointed lower end in alignment with the longitudinal axis of said housing;
   a battery power source mounted in said housing and operably connected to said laser beam module;
   a generally elongated support having a lower base supportable on a horizontal surface and an upper housing suspension member having an upwardly pointed distal end;
   said housing also including a centrally positioned recess formed into a side wall surface of said housing and a downwardly facing conical-shaped pocket positioned within said housing having an upper peak thereof which is aligned with the longitudinal axis of said housing;
   said upwardly pointed distal end supportively engaging into said upper peak to suspend said housing and said laser beam module in free moving pendulum fashion with said pointed lower end positioned slightly above the horizontal surface.

2. A self-leveling laser plumb apparatus comprising:
   an elongated tubular housing having an upper end and a pointed lower end thereof;
   a laser beam module connected in said upper end and producing a laser beam emitted from said laser beam module in alignment with a longitudinal axis of said housing;
   said pointed lower end also in alignment with the longitudinal axis of said housing;
   a battery power source mounted in said housing and operably connected to said laser beam module;
   a generally elongated support having a lower base supportable on a horizontal surface and an upper housing suspension member;
   said suspension member including a first magnet connected to an upper end of said housing;
   said housing including a second magnet connected around said housing upper end and positioned directly above said first magnet;
   said first and second magnets generally vertically aligned and magnetically oriented to suspend said housing in pendulum fashion in precise vertical orientation by gravity with said pointed lower end positioned slightly above the horizontal surface.

3. A self-leveling laser plumb apparatus comprising:
   an elongated housing having an upper end and a pointed lower end thereof;
   a battery-powered laser beam module connected in said upper end and providing a laser beam in alignment with a longitudinal axis of said housing;
   said pointed lower end also in alignment with the longitudinal axis of said housing;
   a generally elongated support having a lower base supportable on a horizontal surface and an upper housing suspension member which is cooperatively structured with an upper portion of said housing to suspend said housing with said laser beam module in free moving pendulum fashion with said pointed lower end positioned slightly above the horizontal surface;
   a centrally positioned recess formed into a side wall surface of said housing and a downwardly opening conical-shaped pocket positioned within said housing having an upper peak or apex thereof which is aligned with the longitudinal axis of said housing;
   said upper housing suspension member includes an upwardly pointed distal end which supportively engages said upper peak or apex to suspend said housing and said laser module in free moving pendulum fashion with said pointed lower end positioned slightly above the horizontal surface, a laser beam thereby being emitted from said laser module striking an overhead surface directly vertically above a mark on the horizontal surface over which said pointed lower end is aligned.

4. A self-leveling laser plumb apparatus comprising:
   an elongated straight tubular housing having an upper end and a pointed lower end thereof;
   a battery-powered laser beam module connected in said upper end emitting a laser beam in alignment wish a longitudinal axis of said housing;
   said pointed lower end also in alignment with the longitudinal axis of said housing;
   a generally elongated support having a lower base supportable on a horizontal surface and an upper housing suspension member which is cooperatively structured with an upper portion of said housing to suspend said housing with said laser beam module in free moving pendulum fashion with said pointed lower end positioned slightly above the horizontal surface;

a first magnet connected to said upper housing suspension member;

said housing including a second magnet connected to said housing upper end and positioned directly above said first magnet;

said first and second magnets generally vertically aligned and magnetically oriented to suspend said first magnet and said housing.

* * * * *